US009631653B2

(12) United States Patent
Flynn et al.

(10) Patent No.: US 9,631,653 B2
(45) Date of Patent: Apr. 25, 2017

(54) PUSH-IN FASTENER

(71) Applicant: ILLINOIS TOOL WORKS INC., Glenview, IL (US)

(72) Inventors: Gregory S. Flynn, Lake Orion, MI (US); Jason M. Zander, Eleva, WI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 14/896,914

(22) PCT Filed: Jun. 18, 2014

(86) PCT No.: PCT/US2014/042901
§ 371 (c)(1),
(2) Date: Dec. 8, 2015

(87) PCT Pub. No.: WO2014/205056
PCT Pub. Date: Dec. 24, 2014

(65) Prior Publication Data
US 2016/0138629 A1 May 19, 2016

Related U.S. Application Data

(60) Provisional application No. 61/837,256, filed on Jun. 20, 2013, provisional application No. 61/932,523, filed on Jan. 28, 2014.

(51) Int. Cl.
*F16B 13/06* (2006.01)
*F16B 5/06* (2006.01)
(Continued)

(52) U.S. Cl.
CPC .......... *F16B 5/0621* (2013.01); *F16B 13/063* (2013.01); *F16B 19/1081* (2013.01); *F16B 41/002* (2013.01)

(58) Field of Classification Search
CPC ...... F16B 5/0621; F16B 5/0642; F16B 13/06; F16B 13/063; F16B 13/0816;
(Continued)

(56) References Cited
U.S. PATENT DOCUMENTS 4,405,272 A * 9/1983 Wollar ................ F16B 19/1081
411/41
4,757,664 A * 7/1988 Freissle ................ B07B 1/4645
16/2.1
(Continued)

FOREIGN PATENT DOCUMENTS

CN 102483086 A 5/2012
CN 102597540 A 7/2012
(Continued)

OTHER PUBLICATIONS

ISR and WO for PCT/US2014/042901 mailed Sep. 3, 2014, 10 pages.

*Primary Examiner* — Roberta Delisle
(74) *Attorney, Agent, or Firm* — Joseph M. Butscher; The Small Patent Law Group, LLC

(57) ABSTRACT

A re-usable push-in fastener includes a fastener grommet including a plurality of deflectable legs and a fastener pin which is inserted into the fastener grommet. The grommet and pin have a pre-installation relative position in which the pin is held in the grommet, with the legs of the grommet in relaxed positions. A full installation relative position for the grommet and pin includes the pin urging the legs outwardly against the surface of a hole in an object in which the grommet is installed.

20 Claims, 5 Drawing Sheets

(51) Int. Cl.
*F16B 19/10* (2006.01)
*F16B 41/00* (2006.01)

(58) Field of Classification Search
CPC .... F16B 13/0858; F16B 13/126; F16B 19/08; F16B 19/1081; F16B 2019/1018; F16B 41/002
USPC ...................................... 411/44–45, 508, 509
See application file for complete search history.

(56) References Cited

U.S. PATENT DOCUMENTS

| | | | | |
|---|---|---|---|---|
| 4,786,225 A * | 11/1988 | Poe | ........................ | F16B 5/065 24/297 |
| 5,085,545 A | 2/1992 | Takahashi | | |
| 5,163,795 A * | 11/1992 | Benoit | ................ | F16B 19/1081 411/41 |
| 5,211,519 A * | 5/1993 | Saito | ................... | F16B 19/1081 411/45 |
| 5,387,065 A * | 2/1995 | Sullivan | .............. | F16B 19/1081 411/45 |
| 5,641,255 A * | 6/1997 | Tanaka | ................ | F16B 19/1081 411/45 |
| 5,846,040 A | 12/1998 | Ueno | | |
| 6,089,805 A * | 7/2000 | Salmon | ............... | F16B 19/1081 411/40 |
| 6,948,375 B2 * | 9/2005 | Nomura | ............... | G01D 11/245 411/45 |
| 7,484,919 B2 * | 2/2009 | Hansen | ............... | F16B 19/1081 411/41 |
| 7,607,875 B2 * | 10/2009 | Shinozaki | ........... | F16B 19/1081 411/21 |
| 2003/0143053 A1* | 7/2003 | Kanie | ................. | F16B 19/1081 411/45 |
| 2005/0123372 A1* | 6/2005 | Sato | ...................... | F16B 5/0258 411/32 |
| 2011/0210223 A1 | 9/2011 | Nishiro | | |
| 2012/0155985 A1 | 6/2012 | Rueckel | | |
| 2012/0213609 A1 | 8/2012 | Moerke et al. | | |

FOREIGN PATENT DOCUMENTS

| | | |
|---|---|---|
| EP | 0682186 A1 | 11/1995 |
| EP | 0682186 A4 | 3/1996 |
| GB | 2463844 A | 3/2010 |

* cited by examiner

PUSH-IN FASTENER

CROSS-REFERENCE TO RELATED APPLICATIONS

The present application is a National Phase of International Application No. PCT/US2014/042901 filed Jun. 18, 2014 and claims the benefits of U.S. Provisional Application Ser. No. 61/837,256 filed Jun. 20, 2013 and U.S. Provisional Application Ser. No. 61/932,523 filed Jan. 28, 2014.

FIELD OF THE INVENTION

The present invention relates generally to fasteners, and more particularly to push-in fasteners used for securing one component to another component, such as, for example, the fasteners used in the automotive industry to secure interior panels, interior and exterior molding and trim, and the like to one another and/or to underlying or related structures. A fastener of this type is sometimes referred to as a fastener clip.

BACKGROUND OF THE INVENTION

Different types of push-in fasteners are known for use in different environments and for different purposes. A basic design for a push-in fastener includes a body that is inserted into aligned openings in first and second articles, or into an opening in at least one of the articles. The fastener body includes a collar or head larger than the opening or openings in the article or articles, and deflectable portions or legs that yield as the body is inserted through the openings and rebound when fully through the openings. The legs are bowed outwardly to define a maximum diameter larger than opening(s) in which the fastener is inserted. During installation of the fastener, the legs deflect inwardly so as to pass through the opening and then rebound outwardly as the maximum diameter portion passes through the opening. The articles to be secured by the fastener can be sandwiched between the collar and the rebounded deflectable portions of the body. A pin of the fastener is inserted into and retained by the body after the body is seated in place in the articles. The pin wedges against the deflectable portions of the body to secure the body in place, and may include still further deflectable elements to increase the retention force of the fastener.

In some known push-in fasteners the body and pin are independent components, completely separate from one another before installation. In other known push-in fasteners, the body and pin having a preinstalled position in which the pin is held in the body but does not interfere with installation of the body in a work piece. The body is first inserted and seated in place by pushing on the head of the body. Once the body is fully seated, the head of the pin is pushed until the pin too is fully seated in the body. It is known to provide the head of the body and the head of the pin of substantially the same size. It is also known in some applications to provide the fastener in a channel or in a shallow well or cavity to conceal and/or protect the heads of the body and the pin.

Deficiencies of known designs for this purpose include the inability of the pin to stay in a pre-drive position until the body is firmly seated. If the pin of the fastener falls from the body of the fastener, the advantages of preassembling fastener are lost. When assembling the articles and fastener, if the pin of the fastener is moved axially inward too far relative to the body of the fastener before the body is firmly seated in the article receiving the body, the pin and body can become locked without the body being seated properly. The articles to be secured by the fastener are not held firmly against one another if the body is not fully inserted and seated where intended. The inability of the pin to stay in the pre-drive position can be improved by increasing the drive interference between the pin and the body; however, this can make the final connection achieved by driving the pin into the body more difficult. Generally, it is desirable that the fastener drives easily but is retained securely. Accordingly, it is often necessary to drive the body by pushing only against the collar of the body and not against the head of the pin. This can be awkward in many assembly situations in which the collar of the body is partly concealed by the head of the pin. Many known fastener designs do not disassemble easily, and are not reusable. This can be problematic if the fastener is used in an assembly that may require periodic disassembly. Further, disassembly can result in damage, or complete separation of the fastener components, making reuse inconvenient or impossible.

It is known also to provide a head on the pin shaped for attachment to another component or thing to be held in position by the fastener. The body can be attached to one piece and the pin to another. By securing the pin and body together, the pieces separate attached to the body and pin are then held in position relative to one another.

Fasteners of these types have been used advantageously and are accepted in many applications. However, such fasteners are not without inadequacies and deficiencies for some uses and applications. Accordingly, push-in fasteners having different characteristics and features are needed.

SUMMARY OF THE INVENTION

The present invention addresses problems of other designs by providing a push-on fastener that includes a body and pin that remain securely in a preassembled condition, yet installs easily for use.

In one form of an embodiment thereof, a push-in fastener is provided with a fastener grommet having a grommet head defining a hole therethrough and a plurality of legs extending from the grommet head. A fastener pin has a pin head and a shaft configured for insertion through the hole in the grommet head. The grommet and pin have a pre-installation relative arrangement in which the pin is held in the grommet with the legs in relaxed states; and the grommet and pin have an installed relative arrangement in which the pin rotates the legs outwardly to define an outer diameter of the legs greater than with the legs in the relaxed states thereof.

In another form of an embodiment thereof, a push-in fastener is provided with a fastener grommet having a grommet head defining a hole therethrough and a plurality of legs extending from the grommet head, and a fastener pin having a pin head of a diameter larger than the hole and a shaft configured for insertion through the hole in the grommet head. The grommet legs have inwardly directed feet. The pin shaft includes a more distal neck and a more proximal neck relative to the head, the more distal being of a first diameter and the more proximal neck being of a second diameter greater than the first diameter. The grommet and the pin have a pre-installation relative arrangement with the grommet secured on the pin by the inwardly directed feet-like tips positioned around the more distal neck, and an installed relative arrangement with the feet-like tips positioned around the more proximal neck.

Advantages of at least some forms of the push-in fastener disclosed herein are that the push-in fastener is easier to handle and install.

Other features and advantages of the invention will become apparent to those skilled in the art upon review of the following detailed description, claims and drawings in which like numerals are used to designate like features.

Figure 1:
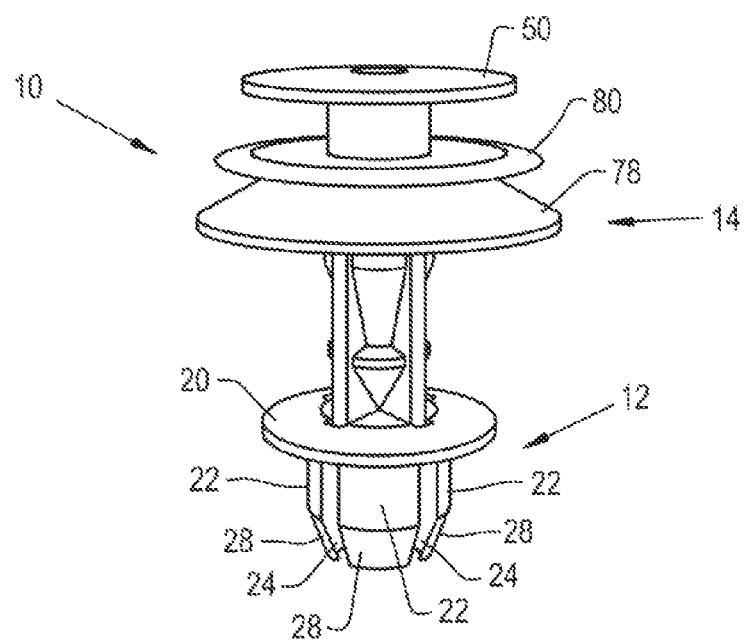
FIG. 1 is a perspective view of a push-in fastener as manufactured.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
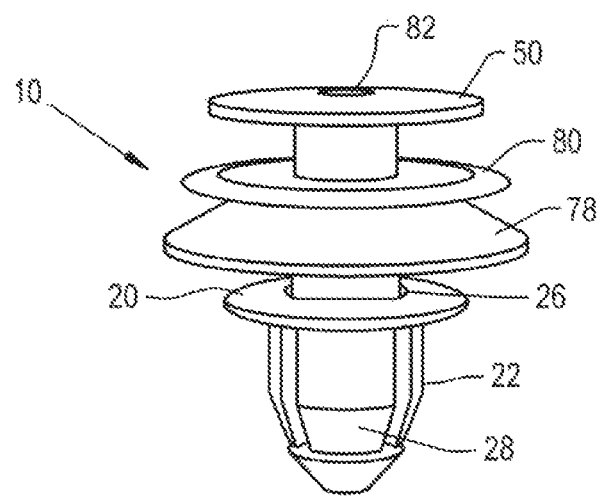
FIG. 2 is a perspective view of the push-in fastener in a preinstalled condition, the fastener being illustrated in a position rotated 180° from the position shown in FIG. 1.

Referring now more specifically to the drawings and to FIG. 1 in particular, an exemplary push-in fastener 10 is shown. Fastener 10 includes a fastener grommet 12 and a fastener pin 14. Fastener grommet 12 is configured to seat within a hole or holes in an article or articles to be fastened together by push-in fastener 10. Fastener pin 14 is configured for insertion into fastener grommet 12 to inhibit fastener grommet 12 from dislodging from the articles in which it is seated. Fastener grommet 12 and fastener pin 14 can be made of plastic by various molding techniques, and can be formed from the same or different materials. Those skilled in the art will understand readily that fastener grommet 12 and fastener pin 14 can be molded as a single piece, with fastener grommet 12 and fastener pin 14 being connected by one or more frangible link easily broken to reposition the relative relationship between grommet 12 and fastener pin 14 from the as molded relationship shown in FIG. 1 to the preinstalled relationship shown in FIG. 2.

Fastener grommet 12 includes a grommet head 20 and a plurality of legs 22, four such legs 22 being shown in the exemplary embodiment, each leg extending axially from one side of grommet head 20. In the exemplary embodiment shown, the four legs 22 are independent and spaced one from the next. Accordingly, elongated spaces 24 are defined between adjacent legs 22. Spaces 24 collectively join into an open space centrally located between all legs 22. Grommet head 20 defines a central opening 26 therethrough.

Each leg 22 includes an inwardly angled distal segment 28 having an inwardly directed foot-like tip 30 from the inner surface thereof. Inwardly angled distal segments 28 collectively provide an entrance end for fastener grommet 12 that is significantly narrower than the diameters of holes in the articles in which the fastener is to be installed. Accordingly, fastener grommet 12 can be positioned easily in a hole for installation. The proximal portions of legs 22, which comprise a substantial axial extent of each leg 22, define an outer diameter not significantly larger than the diameter of a hole in an article in which the fastener is to be installed, and may define a diameter slightly less than the diameter of the hole in which the fastener is to be installed. Accordingly, with legs 22 in natural, unbiased conditions, fastener grommet 12 slides easily into its fully installed position until grommet head 20 engages the surface of the article adjacent the hole in which the fastener is installed.

Grommet head 20 in the exemplary embodiment defines a substantially circular perimeter, but also can be of other shapes. At the transition from grommet head 20 to the individual legs 22, an undercut 32 is formed in the outside thereof, thereby defining a location for controlled bending. In relaxed conditions of legs 22, from central opening 26, a proximal inside surface 34 of each leg 22 is inwardly angled toward a hip 36, at which there is a transition to an outwardly angled surface 38 generally extending from hip 36 to foot-like tip 30. Thus, in the relaxed conditions of legs 22, the inner space defined by the inner surfaces of legs 22 has a generally hourglass configuration. Legs 22 have blunt, outer end edges 40.

The form of fastener grommet 12 just described is exemplary only, and the invention can be used with other types of bodies. For example and not limitation, the legs of the grommet can be of different sizes and shapes; more than four legs or fewer then four legs can be used.

Fastener pin 14 includes a pin head 50 and a shaft 52 extending axially from pin head 50. Shaft 52 is configured for insertion through central opening 26 of grommet head 20 to be received between legs 22. Shaft 52 includes an inverted conical tip 54 including an apex 56 and a base 58. From base 58, a first, more distal neck 60 joins base 58 of conical tip 54 to an intermediate second inverted conical body 62 which is integral at its apex with first neck 60 and has a second conical body base 64. Thus, base 58 of conical tip 54 is exposed outwardly of first neck 60. A more proximal second neck 66 is defined between base 64 of second conical body 62 and an outwardly sloped shoulder 68. Accordingly, base 64 is exposed outwardly of more proximal second neck 66. More distal first neck 60 is narrower than more proximal second neck 66. A slightly inwardly angled central body surface 70 transitions at a waist 72 to a longer, outwardly angled surface 74 that transitions relatively abruptly to a proximal shaft segment 76.

The outer end of pin 14 defines structure for engaging work pieces or items to be held by fastener 10. In the exemplary embodiment, a skirt 78 and flange 80 are provided spaced from pin head 50.

A well 82 extends axially in proximal shaft segment 76 from an opening in head 50. Well 82 is configured to receive a tool or other implement for pushing fastener pin 14 into fastener grommet 12.

Figure 3:
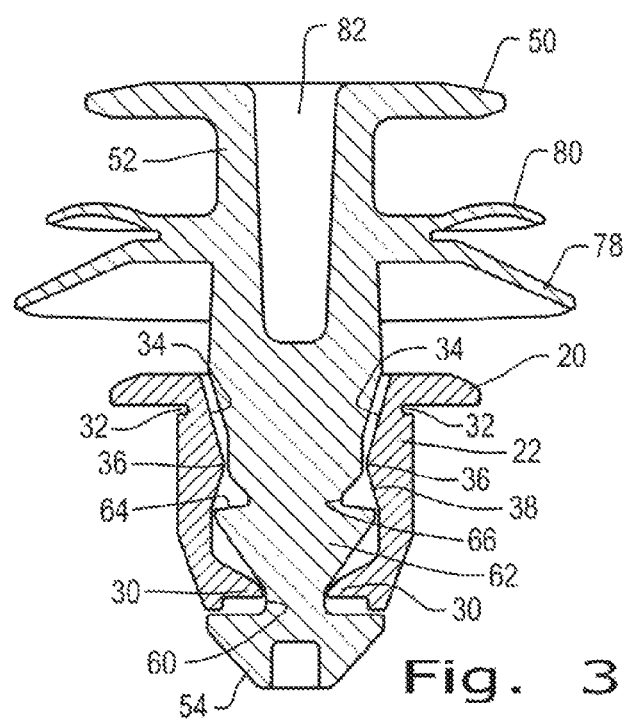
FIG. 3 is a cross-sectional view of the push-in fastener in its pre-installed condition as shown in FIG. 2.

The cross-sectional view of FIG. 3 illustrates the preinstalled condition for fastener 10. The shapes and dimensions of fastener grommet 12 and fastener pin 14 are such that conical tip 54 extends beyond the ends of legs 22, second conical body 62 is generally disposed in the inner area or space between hips 36 and feet-like tips 30, with feet-like tips 30 extending into the space formed around first neck 60 between conical tip 54 and second conical body 62. Accordingly, legs 22 remain in their natural, relaxed conditions. However, pin 14 is retained in grommet 12 by the exposed area of base 58 engaging outer end edges 40 of legs 22 to limit withdrawal of pin 14 from grommet 12. Skirt 78 limits over insertion of pin 14 into grommet 12. The width of proximal shaft segment 76 relative to the width of the central space defined between legs 22 places the angled surfaces 34 and 74 in opposition to each other, thereby retaining pin 14 in its pre-installation position relative to grommet 12.

Figure 4:
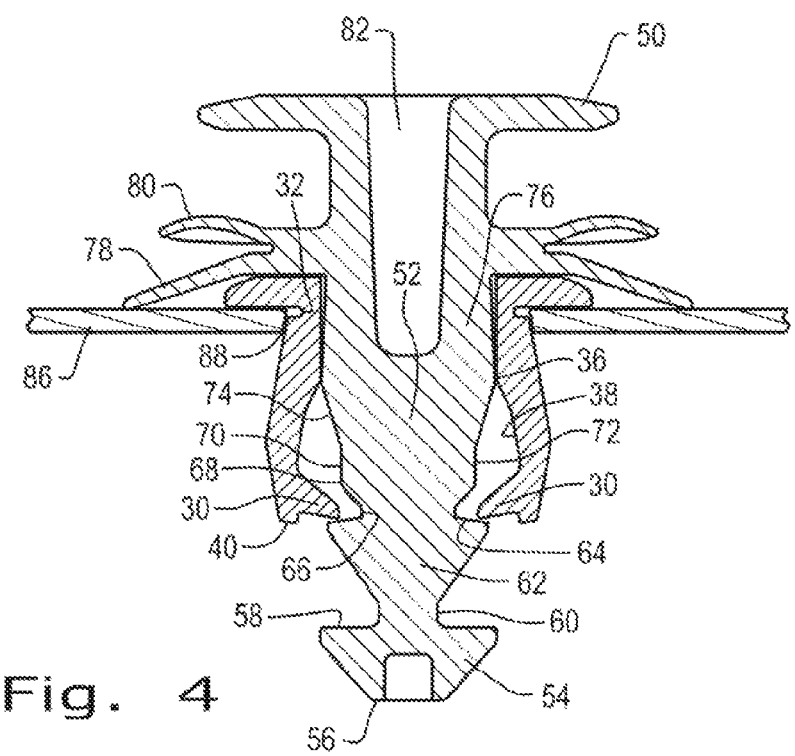
FIG. 4 is an cross-sectional view of the push-in fastener in a fully installed condition.

The cross-sectional view of FIG. 4 illustrates the fully installed condition for fastener 10. Fastener pin 14 has been moved by force to be more deeply positioned in and relative to fastener grommet 12 such that second conical body 62 now extends beyond the outer end edges 40 of legs 22. Feet-like tips 30 extending into the space formed around second neck 66, and the upper broader region of proximal shaft segment 76 engages surfaces 34. This causes legs 22 to bend outwardly at undercuts 32, thereby defining a greater maximum diameter around legs 22 then when legs 22 are allowed to remain in their relaxed conditions. With a properly sized hole 84 in a work piece 86, grommet 12 is held securely in work piece 86. If the diameter defined around legs 22 in the relaxed, unbiased state of the legs is slightly less than, the same as or not significantly larger than the diameter of hole 84, grommet 12 can be inserted easily into hole 84 if pin 14 is held in the preinstalled condition shown in FIG. 3. It should be noted that pushing on pin 14 does not result in the outward bending of legs 22 until grommet head 20 engages work piece 86 so that further axial force against pin 14 causes pin 14 to move from the preinstalled condition of FIG. 3 to the fully installed condition shown in FIG. 4.

Figure 5:
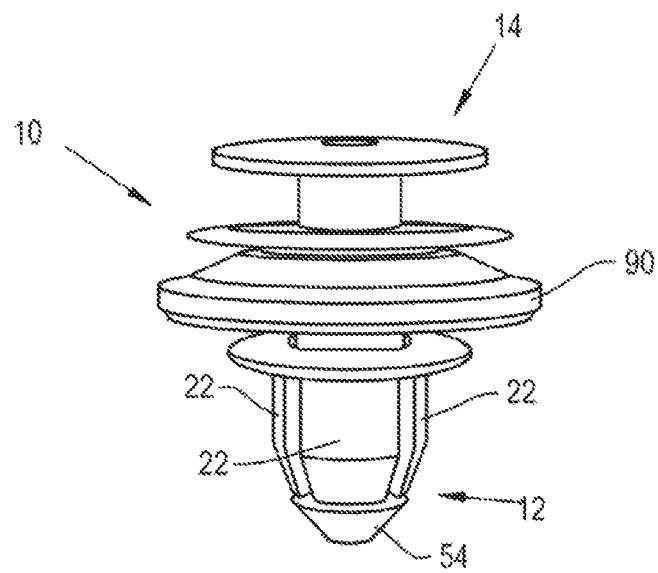
FIG. 5 is an elevational view of a modified form of the push-in fastener shown in FIGS. 1-4.
Figure 6:
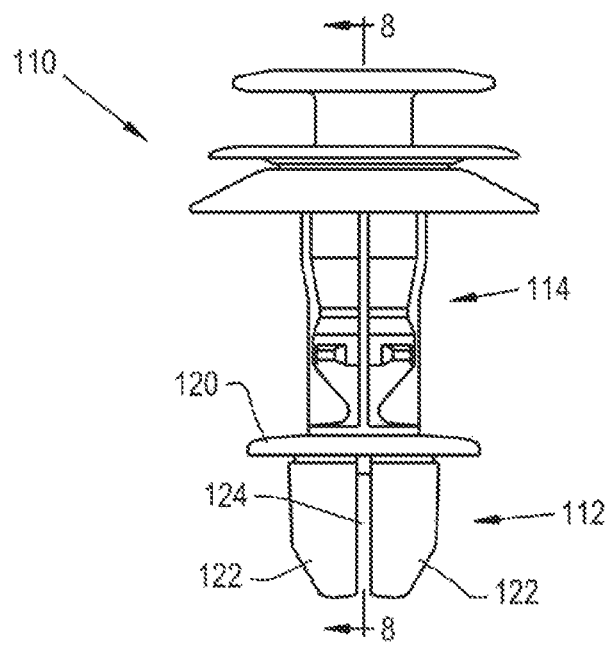
FIG. 6 is an elevational view of another embodiment for a push-in fastener.

FIG. 5 shows a simple modification by addition to fastener 10. A seal body 90 is provided beneath skirt 78 to establish an environmental seal and/or a resilient cushion against work piece 86. Seal body 90 can be applied by overmolding.

Fastener 10 is removable and reusable. When sufficient extraction force is applied to withdraw fastener pin 14 relative to fastener grommet 12, the confronting angled surfaces will slide relative to one another, thereby withdrawing the pin and moving back to the relative positions shown in the pre-installation condition of FIG. 3. The grommet can then be removed easily from the work piece, item or article in which it is installed. However, even when so removed, grommet 12 and pin 14 remain connected securely to one another as described relative to the preinstalled position. From this position, fastener 10 can be reinstalled and reused. The desirable retention force can be designed into the fastener by selecting the various dimensions and angles.

FIGS. 6-9 show a second embodiment of a fastener 110 having features similar to fastener 10, including a fastener grommet 112 and a fastener pin 114. Accordingly, similar structures of fastener 110 to those of fastener 10 are designated with similar reference numerals in the "100" series of numerals. Fastener grommet 112 includes a grommet head 120, a plurality of legs 122 separated by spaces 124 and defining a central opening 126. In the exemplary embodiment, four legs 122 are used, but more legs or fewer legs also can be used. Angled distal segments 128 on each leg 122 are somewhat enlarged toward the ends thereof and define inwardly directed, corner-like tips 130 rather than the more pronounced foot-like projections of tips 30 of legs 22. Undercuts 132 established between head 120 and legs 122 enable bending and the outward deflection of legs 122 to engage the grommet 112 against a hole 184 in a work piece 186. Inwardly angled surfaces 134 extend to a hip 136 transitioning to outwardly angled surfaces 138 toward outer end edges 140 of legs 122.

Fastener pin 114 includes a pinhead 150 and a pin shaft 152. Shaft 152 includes an inverted conical tip 154 having an apex 156 and a base 158. A first neck 160 connects base 158 of conical tip 154 to an intermediate second inverted conical body 162 having a second base 164. A second neck 166 connects to a shoulder 168 leading to inwardly angled central body surfaces 170 and a waist 172. Waist 172 transitions to an outwardly angled surface 174 leading to a proximal shaft segment 176. Pin 114 further includes a skirt 178 and a flange 180 and a well 182.

Pin 114 differs from pin 14 in that some of the angled surfaces are more gradual, and transitions between outwardly angled and inwardly angled surfaces are less abrupt and are more rounded. Accordingly, fastener 110 can be disconnected more easily and with less damage, thereby further facilitating reuse.

Figure 7:
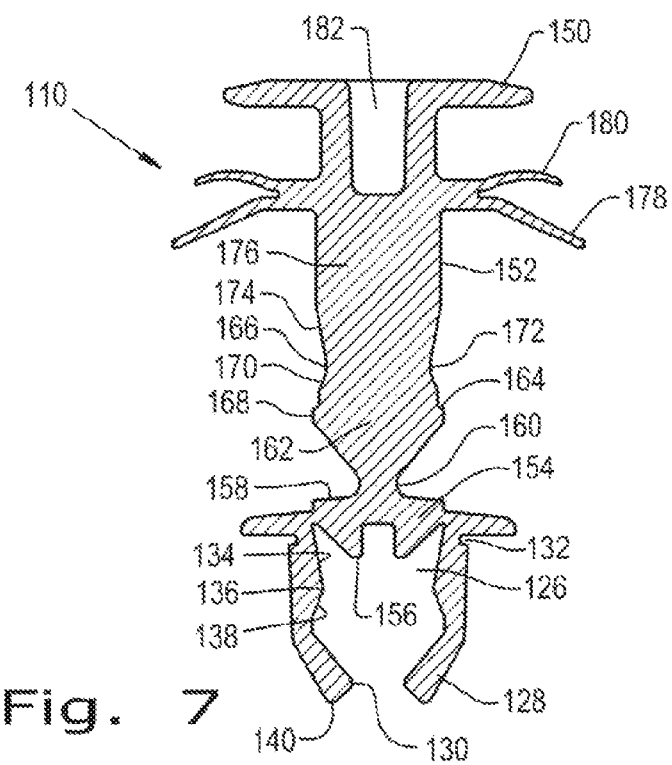
FIG. 7 a cross-sectional view of the push-in fastener shown in FIG. 6.
Figure 8:
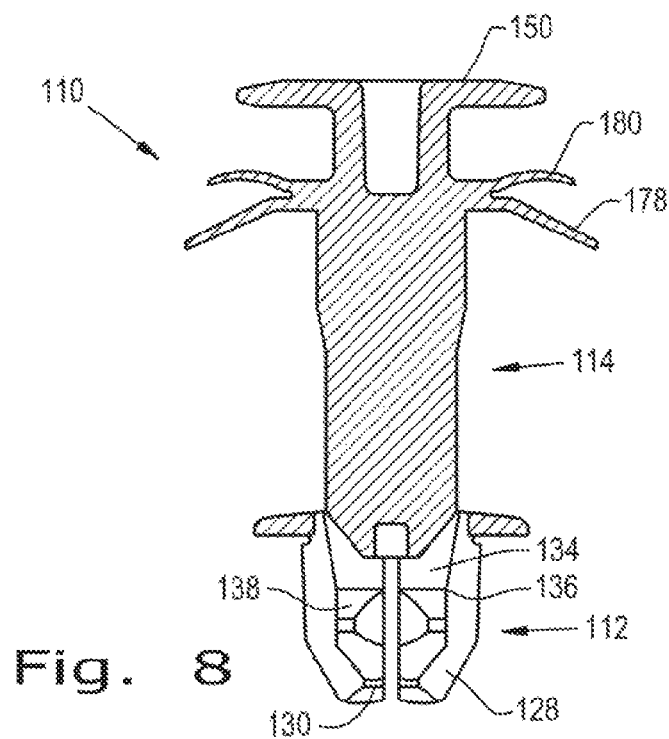
FIG. 8 is another cross-sectional view of the push-in fastener shown in FIG. 6, taken along line 8-8 of FIG. 6.
Figure 9:
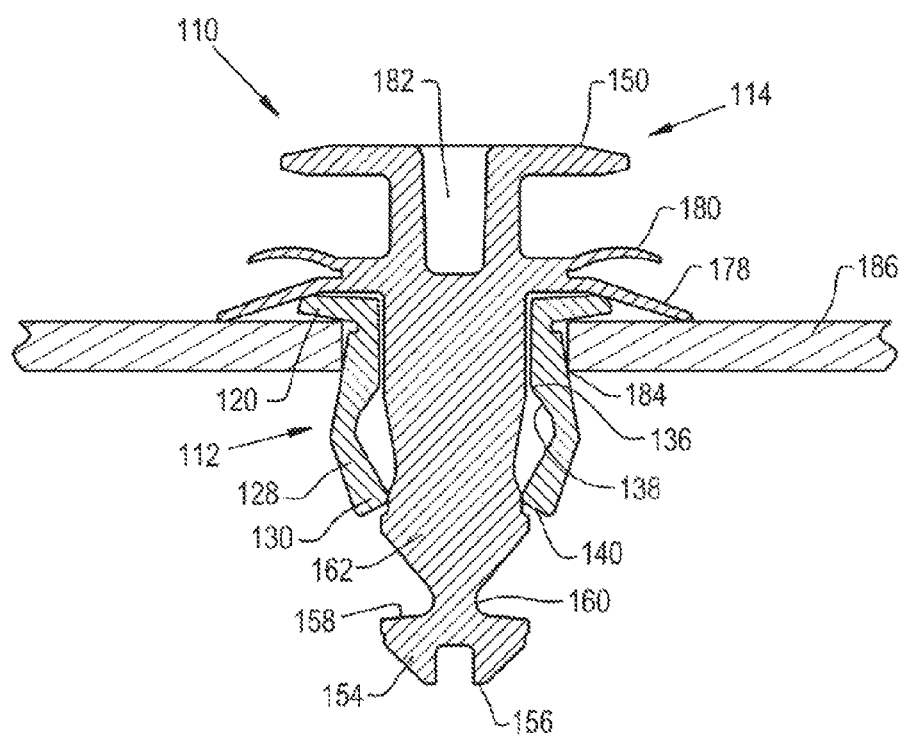
FIG. 9 is a cross-sectional view of the push-in fastener shown in FIGS. 6-8, and illustrating the fastener in an installed condition.

FIG. 7 illustrates an as-molded condition of fastener 110, with pin 114 connected to grommet 112 by frangible connections between conical tip 154 and grommet head 120. From this condition, pin 114 can be advanced to a preinstalled condition wherein grommet 112 and pin 114 are separate but engaged with one another by advancing the pin and fracturing the frangible connections.

A preinstalled condition of fastener 110 is similar to that of fastener 10. Conical tip 154 extends beyond the ends of legs 122, second conical body 162 is generally disposed in the inner area or space between hips 136 and inwardly directed tips 130, with inwardly directed tips 130 extending into the space formed around first neck 160 and outer end edges 140 directed at base 158 of conical tip 154 outwardly of neck 160. Accordingly, legs 122 remain in their natural, relaxed conditions. However, pin 114 is retained in grommet 112 by the exposed area of base 158 engaging outer end edges 140 of legs 122 to limit withdrawal of pin 114 from grommet 112. Skirt 178 limits over insertion of pin 114 into grommet 112. The width of proximal shaft segment 176 relative to the width of the central space defined between legs 122 places the angled surfaces 134 and 174 in opposition to each other, thereby retaining pin 114 in its pre-installation position relative to grommet 112.

A fully installed condition of fastener 110 (FIG. 9) is similar to that of fastener 10. Fastener pin 114 is been moved by force to be more deeply positioned in and relative to fastener grommet 112 such that second conical body 162 now extends beyond the outer end edges 140 of legs 122. Inwardly directed tips 130 extending into the space formed around second neck 166, and the upper broader region of proximal shaft segment 176 engages surfaces 134 of grommet 112. This causes legs 122 to bend outwardly at undercuts 132, thereby defining a greater maximum diameter around legs 122 then when legs 122 are allowed to remain in their relaxed conditions. With a properly sized hole 184 in a work piece 186, grommet 112 is held securely in work piece 186. If the diameter defined around legs 122 in the relaxed, unbiased state of the legs is slightly less than, the same as or not significantly larger than the diameter of hole 184, grommet 112 can be inserted easily into hole 184 if pin 114 is held in the preinstalled condition.

Fastener 110 is removable and reusable. When sufficient extraction force is applied to withdraw fastener pin 114 relative to fastener grommet 112, the confronting angled surfaces will slide relative to one another, thereby withdrawing the pin and moving back to the relative positions of the pre-installation condition. The grommet can then be removed easily from the work piece, item or article in which it is installed. However, even when so removed, grommet 112 and pin 114 remain connected securely to one another as described relative to the preinstalled position. From this position, fastener 110 can be reinstalled and reused.

Fasteners 10, 110 provide several features and advantages. The angled surfaces of the pins 14, 114 and grommets 12, 112 act as ramps facilitating installation and connection. Contact between the outer surface of the grommet legs and the inner hole surface of the work piece result in fasteners and panels being retained to an attachment panel. Skirts 78, 178 provide tension against articles being secured, and the angled surfaces of the grommets 12, 112 enable fasteners 10, 110 to be installed and connected to panels of differing thicknesses. The fasteners in preinstalled conditions can be installed as an assembly in one item or thing, that is then connected to a second item or thing by inserting the grommet into the second item or thing and urging the first item or thing toward the second item or thing to advance the pin in the grommet to the fully installed condition. Alternatively, pins 14, 114 can be connected to one item or thing, and grommets 12, 114 to a second item or thing so that the first and second items or things can be secured relative to one another by the simple engagement of pins 14, 114 in grommets 12, 112. Four points of contact are provided when four legs 22, 122 are used, providing security, rigidity and natural centering in holes 84, 184. Installer feedback can be provided by both feel and sound as the angled surfaces and transitions move from one position to another position and as pins 14, 114 reach their final installed positions in grommets 12, 112. For example, inwardly directed tips 30, 130 moving past the outer edges of second conical base 64, 164 can provide a distinct feel and sound. Installation and attachment is easy even if a punching process for making holes 84, 184 result in burrs or malformations in the holes.

While the fasteners 10, 110 disclosed herein are multi-piece, including both a grommet 12, 112 and a pin 14, 114; the components are installed as a single, preassembled unit, and can be removed as a single, still assembled unit. Accordingly, the grommets 12, 112 remain connected to the pins 14, 114; unlike occurs during the removal of known pin and grommet connectors when the grommets remain in the item when the pin is removed. Accordingly, the present fastener can be removed when the connected items or things are accessible from only one side, and can re-installed numerous times while retaining substantially the same retention capabilities.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A push-in fastener, comprising:
    a fastener grommet having a grommet head defining a hole therethrough and a plurality of legs extending from said grommet head, said legs having inwardly angled inner surfaces adjacent said hole in said grommet head and transitions from said inwardly angled inner surfaces to outwardly angled inner surfaces:
    a fastener pin having a pin head and a shaft configured for insertion through said hole in said grommet head, said pin including a proximal segment wider than a space defined between said transitions;
    said grommet and said pin having a pre-installation relative arrangement in which said pin is held in said grommet with said legs in relaxed states; and
    said grommet and said pin having an installed relative arrangement in which said pin holds said legs in outwardly rotated positions to define an outer diameter of said legs greater than with said legs in said relaxed states.

2. The push-in fastener of claim 1, including undercuts at transitions from said grommet head to outer surfaces of said legs.

3. The push-in fastener of claim 1, said pin shaft including a more distal neck of a first diameter and a more proximal neck of a second diameter greater than said first diameter.

4. The push-in fastener of claim 3, including undercuts at transitions from said grommet head to outer surfaces of said legs.

5. The push-in fastener of claim 3, said grommet having four said legs.

6. The push-in fastener of claim 5, said legs including inwardly directed tips positioned around said more distal neck in said pre-installation relative arrangement and around said more proximal neck in said installed relative arrangement.

7. The push-in fastener of claim 1, said legs including inwardly directed tips positioned around a narrower region of said pin in said pro-installation relative arrangement and around a thicker region of said pin in said installed relative arrangement.

8. The push-in fastener of claim 1, said pin including an inwardly angled surface from said proximal segment to more distal portions of said pin.

9. The push-in fastener of claim 8, said pin shaft including a more distal neck of a first diameter and a more proximal neck of a second diameter greater than said first diameter.

10. The push-in fastener of claim 9, said legs including inwardly directed tips positioned around said more distal neck in said pre-installation relative arrangement and around said more proximal neck in said installed relative arrangement.

11. A push-in fastener, comprising:
    a fastener grommet having a grommet head defining a hole therethrough and a plurality of legs extending from said grommet head, said legs having inwardly angled inner surfaces adjacent said hole in said grommet head and transitions from said inwardly angled inner surfaces to outwardly angled inner surfaces:
    a fastener pin having a pin head of a diameter larger than said hole and a shaft configured for insertion through said hole in said grommet head, said pin including a proximal segment wider than a space defined between said transitions;

said grommet legs having inwardly directed tips;

said pin shaft including a more distal neck and a more proximal neck relative to said head, said more distal neck being of a first diameter and said more proximal neck being of a second diameter greater than said first diameter, said grommet and said pin having a pro-installation relative arrangement with said grommet secured on said pin by said inwardly directed tips positioned around said more distal neck; and said grommet and said pin having an installed relative arrangement with said inwardly directed tips positioned around said more proximal neck.

12. The push-in fastener of claim 11, including undercuts at transitions from said grommet head to outer surfaces of said legs.

13. The push-in fastener of claim 11, including undercuts at transitions from said grommet head to outer surfaces of said legs.

14. The push-in fastener of claim 11, said pin including an inwardly angled surface from said proximal segment to more distal portions of said pin.

15. A push-in fastener, comprising:

a fastener grommet having a grommet head defining a hole therethrough and a plurality of legs extending from said grommet head, said legs having inwardly angled inner surfaces adjacent said hole in said grommet head and transitions from said inwardly angled inner surfaces to outwardly angled inner surfaces; and a fastener pin having a pin head and a shaft configured for insertion through said hole in said grommet head, said pin including a proximal segment wider than a space defined between said transitions.

16. The push-in fastener of claim 15, said pin shaft including a more distal neck of a first diameter and a more proximal neck of a second diameter greater than said first diameter.

17. The push-in fastener of claim 15, including undercuts at transitions from said grommet head to outer surfaces of said legs.

18. The push-in fastener of claim 15, said pin including an inwardly angled surface from said proximal segment to more distal portions of said pin.

19. The push-in fastener of claim 18, said pin shaft including a more distal neck of a first diameter and a more proximal neck of a second diameter greater than said first diameter.

20. The push-in fastener of claim 19, said legs including inwardly directed tips positioned around said more distal neck in said pre-installation relative arrangement and around said more proximal neck in said installed relative arrangement.

* * * * *